(12) United States Patent
Puiu

(10) Patent No.: US 8,382,623 B2
(45) Date of Patent: Feb. 26, 2013

(54) HYBRID TRANSMISSION HAVING SYNCHRONIZERS

(75) Inventor: Dumitru Puiu, Sterling Heights, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 13/350,021

(22) Filed: Jan. 13, 2012

(65) Prior Publication Data

US 2012/0115660 A1 May 10, 2012

Related U.S. Application Data

(63) Continuation of application No. 11/565,782, filed on Dec. 1, 2006, now Pat. No. 8,118,703.

(51) Int. Cl.
  *F16H 3/72* (2006.01)
  *F16H 37/06* (2006.01)

(52) U.S. Cl. .......................... 475/5; 903/911

(58) Field of Classification Search ..... 475/5; 180/67.5; 903/911; 74/339
See application file for complete search history.

(56) References Cited

U.S. PATENT DOCUMENTS

| | | | |
|---|---|---|---|
| 5,931,757 A | 8/1999 | Schmidt | |
| 6,306,057 B1 | 10/2001 | Morisawa et al. | |
| 6,494,801 B1 | 12/2002 | Ohtake et al. | |
| 6,669,596 B1 | 12/2003 | Sefcik | |
| 6,712,734 B1 | 3/2004 | Loeffler | |
| 6,716,126 B2 | 4/2004 | Bowen | |
| 6,811,010 B1 | 11/2004 | Armstrong | |
| 6,953,409 B2 | 10/2005 | Schmidt et al. | |
| 7,004,881 B2 | 2/2006 | Haka | |
| 7,101,298 B2 | 9/2006 | Sowul et al. | |
| 7,110,871 B2 | 9/2006 | Hubbard et al. | |
| 7,150,698 B2 | 12/2006 | Sakamoto et al. | |
| 7,214,156 B2 | 5/2007 | Oliver | |
| 7,263,907 B2 | 9/2007 | Stevenson | |
| 7,282,008 B2 | 10/2007 | Oshidari | |
| 7,291,087 B2 | 11/2007 | Haka et al. | |
| 7,318,787 B2 | 1/2008 | Tabata et al. | |
| 7,396,306 B2 | 7/2008 | Long et al. | |
| 7,497,803 B2 | 3/2009 | Sah et al. | |
| 2002/0177500 A1 | 11/2002 | Bowen | |
| 2003/0069103 A1* | 4/2003 | Ibamoto et al. | 475/5 |
| 2005/0107198 A1 | 5/2005 | Sowul et al. | |
| 2005/0137042 A1 | 6/2005 | Schmidt et al. | |
| 2006/0240928 A1* | 10/2006 | Raghavan et al. | 475/5 |
| 2006/0246794 A1 | 11/2006 | Foster et al. | |
| 2007/0021257 A1* | 1/2007 | Klemen et al. | 475/5 |
| 2007/0049440 A1* | 3/2007 | Raghavan et al. | 475/5 |
| 2007/0087894 A1 | 4/2007 | Tsuneyoshi et al. | |
| 2007/0093341 A1 | 4/2007 | Supina et al. | |
| 2007/0105679 A1* | 5/2007 | Tabata et al. | 475/5 |
| 2008/0125264 A1 | 5/2008 | Conlon et al. | |

* cited by examiner

*Primary Examiner* — Justin Holmes
(74) *Attorney, Agent, or Firm* — Frederick A Krieger

(57) ABSTRACT

A transmission used in a hybrid vehicle comprising a planetary gear set and a synchronizer. The planetary gear set having a plurality of members and the synchronizer coupling and decoupling one of the members to change a speed ratio in the transmission.

15 Claims, 2 Drawing Sheets

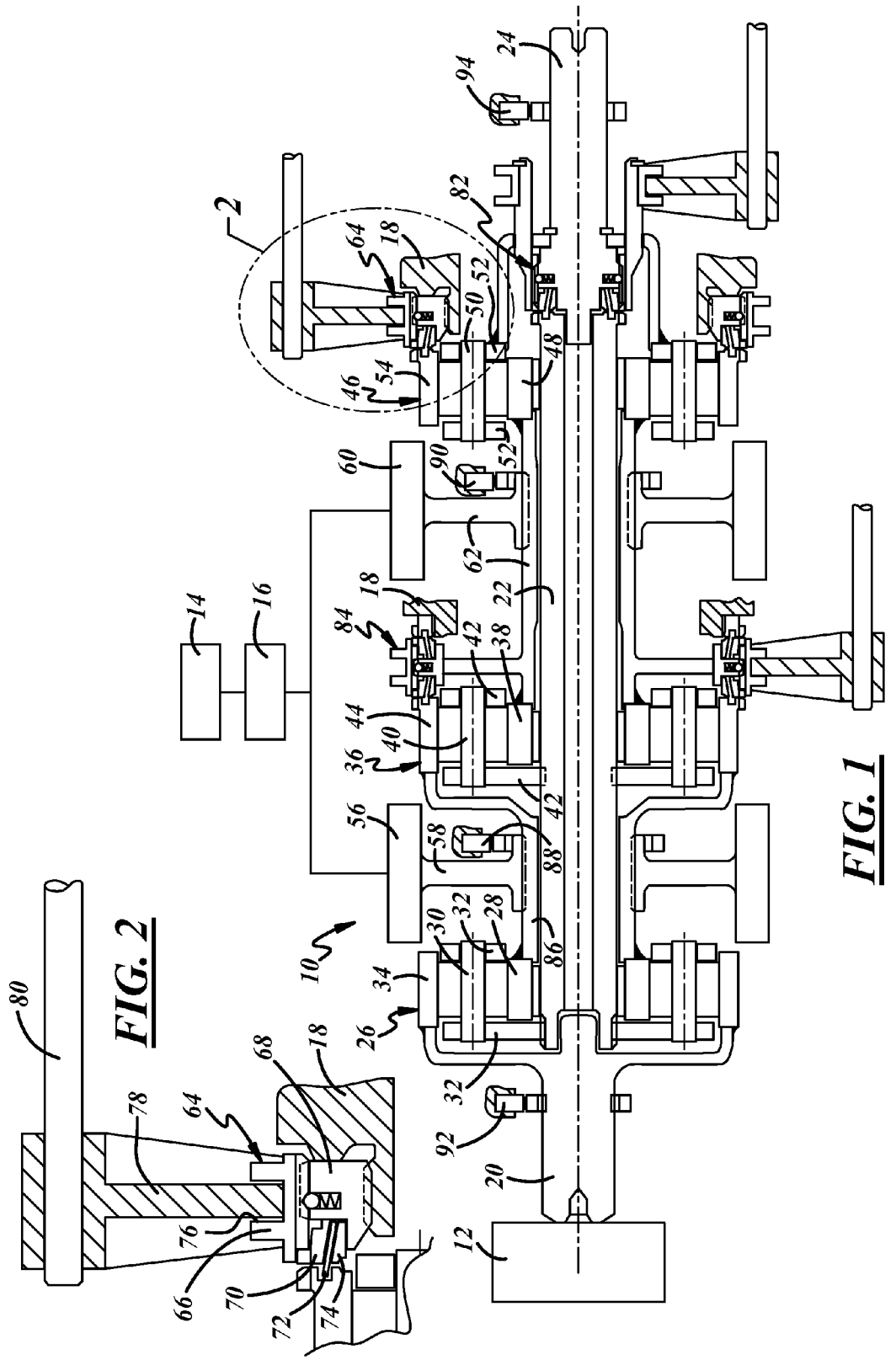

| | | S1 | S2 | S3 | S4 |
|---|---|---|---|---|---|
| Low EVT Mode | EVT 1 | On | | | |
| 1st Mode | Fixed 1 | On | | | On |
| 2nd Mode | Fixed 2 | On | On | | |
| High EVT Mode | EVT 2 | | On | | |
| 3rd Mode | Fixed 3 | | On | | On |
| 4th Mode | Fixed 4 | | On | On | |
| Reverse Mode | EVT 1 | On | | | |
| Engine Start-Stop | ESS | On | | | |
| Electric Mode | Electric | On | | | |

HYBRID TRANSMISSION HAVING SYNCHRONIZERS

CROSS-REFERENCE TO RELATED APPLICATION

This application relates to, and is entitled to the benefit of the earlier filing date and priority of U.S. patent application Ser. No. 11/565,782, filed Dec. 1, 2006, the disclosure of which is incorporated herein by reference.

FIELD OF THE INVENTION

The present invention relates generally to transmissions, and more particularly to transmissions used in hybrid vehicles.

BACKGROUND OF THE INVENTION

Hybrid vehicles commonly use at least two different energy conversion processes that can include a mechanical engine and an electric motor. And the associated transmission, or whether a transmission is used at all, sometimes depends on the particular drive configuration of the hybrid vehicle—parallel, serial, or mixed. One example of a transmission that can be used in a mixed hybrid is an electrically variable transmission (EVT).

EVT transmissions typically have at least one planetary gear set where the mechanical engine and the electric motor are operatively connected to different members of the planetary gear sets. Further, wet clutches are used to change speed ratios in the transmission, and hydraulic systems are in turn used to control the wet clutches. Hydraulic systems are complex, costly, and require many components including the particularly bulky and difficult to manufacture valve bodies.

SUMMARY OF THE INVENTION

One implementation of a presently preferred transmission that is used in a hybrid vehicle comprises at least one planetary gear set with a plurality of members, and at least one synchronizer that selectively couples and decouples at least one of the plurality of members to change a speed ratio in the transmission.

Another implementation of a presently preferred transmission that is used in a hybrid vehicle comprises an input shaft, an output shaft, a first planetary gear set, a second planetary gear set, a third planetary gear set, a first electric motor, a second electric motor, and at least one synchronizer. The first planetary gear set is operatively connected to the input shaft, the second planetary gear set is operatively connected to the first planetary gear set, and the third planetary gear set is operatively connected to the second planetary gear set. Further, the first electric motor is operatively connected to both the first and second planetary gear sets, and the second electric motor is operatively connected to both the second and third planetary gear sets. Lastly, the synchronizer can be actuated and deactuated to change a speed ratio in the transmission.

Another implementation of a presently preferred transmission that is used in a hybrid vehicle comprises an input shaft, an output shaft, a first planetary gear set, a second planetary gear set, a third planetary gear set, a first electric motor, a second electric motor, a first synchronizer, a second synchronizer, and a third synchronizer.

BRIEF DESCRIPTION OF THE DRAWINGS

These and other objects, features and advantages of the present invention will be apparent from the following detailed description of the preferred embodiments and best mode, appended claims and accompanying drawings in which:

FIG. 1 is a schematic of the general configuration of an embodiment of a transmission used in a hybrid vehicle;

FIG. 2 is an enlarged view of a synchronizer shown in the transmission of FIG. 1;

DETAILED DESCRIPTION OF PREFERRED EMBODIMENTS

Figures 3, 4:
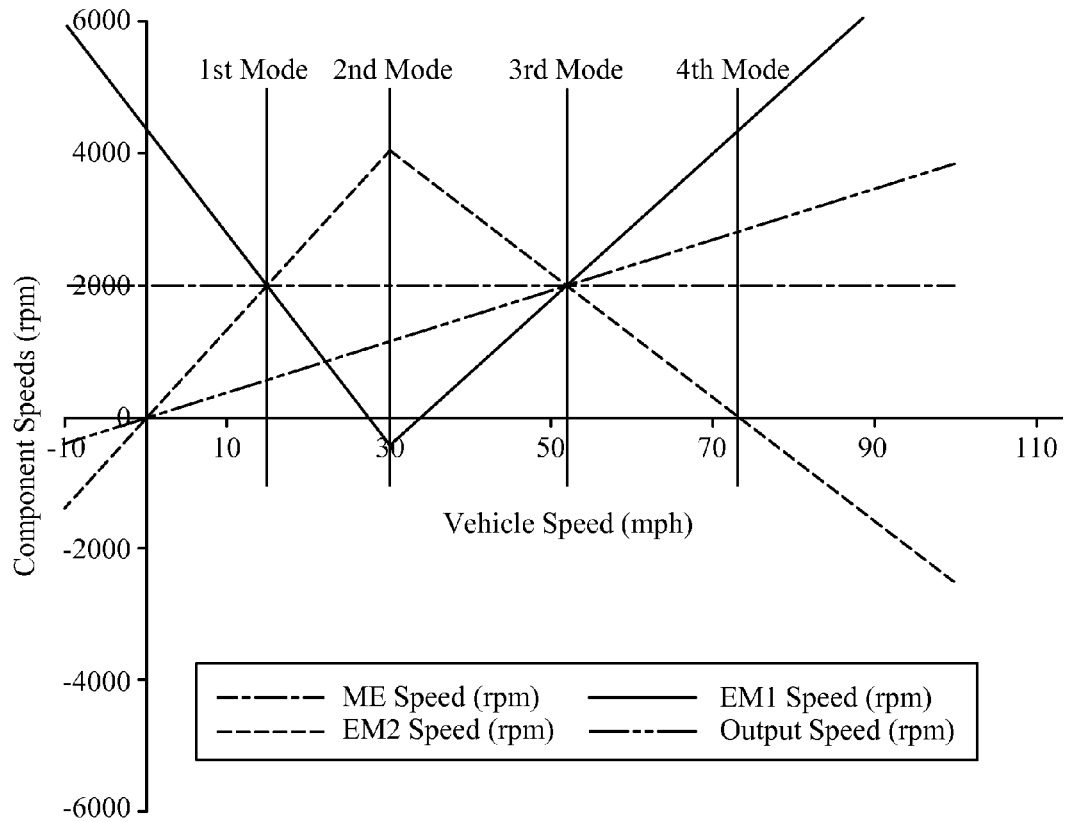
FIG. 3 is a graph showing different component speeds on the y-axis versus vehicle speed on the x-axis for the transmission of FIG. 1, as the transmission changes speed ratios.
FIG. 4 is a chart showing the status of each synchronizer at the different operating modes of the transmission of FIG. 1.

Referring in more detail to the drawings, FIG. 1 shows an exemplary configuration of a transmission 10 used in a hybrid vehicle (not shown) that does not require wet clutches to change speed ratios in the transmission. The hybrid vehicle itself can include, among other components, a mechanical engine 12 that sends torque to the transmission 10, one or more batteries 14 that store electrical power, one or more power inverters 16 that deliver electrical power, and various controllers (not shown) that control components in the transmission. The mechanical engine 12 can be an internal combustion engine, a diesel engine, or the like, that can for example emit torque at about a constant 2,000 revolutions per minute (rpm) throughout transmission operating modes. The battery 14 can be used to store and dispense electrical power to electric motors. The battery can be a high voltage DC battery, or any other device that can likewise store and dispense electrical power. The power inverter 16 delivers that stored electrical power to electric motors and also enables the battery 14 to store power during regenerative braking. And the various controllers can include a motor controller (not shown) for an electric motor.

The transmission 10 can be of any type suitable for use in hybrid vehicles that receive torque from the mechanical engine 12 and deliver that torque to wheels (not shown) of the vehicle; in particular, the transmission 10 can be the two-mode type. The transmission 10 has at least one planetary gear set to provide a mechanical advantage, and at least one synchronizer to help provide that mechanical advantage. The transmission 10 can further include at least one electric motor that can give torque to the transmission, several shafts that can carry torque, and a housing 18 to provide structure to the transmission and that can be in the form of a transmission case or supports. The above transmission components, and others, take the transmission through various operating modes to change speed ratios. And many of these components are "operatively connected or joined" to one another, meaning that they emit or drive torque to one another either directly, as when the components physically touch each other, or indirectly, as when the components are connected through one or more other components.

As mentioned, a planetary gear set is used in the transmission 10 to give the transmission any one of numerous known mechanical advantages. For instance, the planetary gear set can include several members that—depending on a particular condition, i.e., whether the particular member is driving, driven, or held stationary—can provide a speed increase with a torque decrease, a speed decrease with a torque increase, a direct drive, a reverse drive, and others. Each condition can constitute a different operating mode with its own speed ratios, output torques, and output speeds.

Particular to this embodiment, a first planetary gear set 26 can include a sun gear 28, a plurality of planet gears 30 that are meshed with the sun gear 28 and disposed on a carrier 32, and a ring gear 34 that is meshed with the planet gears 30. Likewise, a second planetary gear set 36 can include a sun gear 38, a plurality of planet gears 40 that are meshed with the sun gear 38 and disposed on a carrier 42, and a ring gear 44 that is meshed with the planet gears 40. And a third planetary gear set 46 can include a sun gear 48, a plurality of planet gears 50 that are meshed with the sun gear 48 and disposed on a carrier 52, and a ring gear 54 that is meshed with the planet gears 50. As between these planetary gear sets, the sun gear 28 can be operatively joined to the ring gear 44 through a hub plate gear 86, and the sun gear 38 can be operatively connected to the sun gear 48 through a second sleeve shaft 62.

The several shafts generally carry torque through the transmission 10 from the mechanical engine 12 to drive the hybrid vehicle. An input shaft 20 receives torque from the mechanical engine 12 and sends that torque to other transmission components. The input shaft can be driven directly by the mechanical engine or indirectly through a torque transfer device (not shown). The torque transfer device can be incorporated between the mechanical engine 12 and the input shaft 20 to provide a selective torque-dampened connection between the mechanical engine and the input shaft. At its other end, the input shaft 20 is operatively connected to a planetary gear set; specifically, the input shaft 20 can be operatively connected or directly connected to the ring gear 34.

An intermediate shaft 22 can also be included. The intermediate shaft 22 can operatively join one planetary gear set to another planetary gear set, and can be selectively operatively connected to one more planetary gear set. Specifically, the intermediate shaft 22 can operatively join the carrier 32 to the carrier 42. In this way, the intermediate shaft can carry torque between these planetary gear sets.

An output shaft 24 can be further included that receives torque from other transmission components and sends it eventually to the drive wheels. To do this, the output shaft 24 is operatively connected to the carrier 52 of the third planetary gear set 46.

Also mentioned, an electric motor can be used in the transmission 10 that can act as a motor or a generator in a particular operating mode. For example, the electric motor can give torque to, or drive, one or more planetary gear sets, provide a braking function, and can substantially synchronize the speeds of different transmission components. The term "substantially synchronize" can mean bringing the relative rotation speed of each different transmission component within a particular range, for example within a +/−50 rpm range, so that the components can eventually engage each other at about the same speed.

Still referring to FIG. 1, a first electric motor 56, or generator, can be incorporated between the first planetary gear 26 and the second planetary gear set 36. The first electric motor 56 can be operatively connected to, and thus can drive, a member on each of the first and second sets by a first sleeve shaft 58. Specifically, the first electric motor 56 can be operatively connected to the sun gear 28 and the ring gear 44.

Similarly, a second electric motor 60, or generator, can be incorporated between the second planetary gear set 36 and the third planetary gear set 46. The second electric motor 60 can be operatively connected to, and thus can drive, a member on each of the second and third planetary gear sets by the second sleeve shaft 62. Specifically, the second electric motor 60 can be operatively connected to the sun gear 38 and the sun gear 48.

A synchronizer is used in the transmission 10 to smoothly engage two rotating transmission components so that they rotate at the same speed while avoiding a transmission bump, or noticeable impulse load during an operating mode change. The synchronizer can be selectively actuated or deactuated to couple/decouple or ground/unground the particular transmission component when the transmission changes operating modes. In general, synchronizers will be known to those of ordinary skill in the art, and suitable synchronizers can include those used in manual transmissions or in transfer cases.

In this embodiment, a first synchronizer 64 is disposed adjacent the third planetary gear set 46, specifically adjacent the ring gear 54 so that the first synchronizer can ground the ring gear to the transmission housing 18 when actuated, and unground the ring gear from the housing when deactuated. Referring to FIG. 2, the first synchronizer 64 is a double cone synchronizer, but it could be a single or triple cone synchronizer depending partly on the thermal load it will endure. The first synchronizer 64 can have, among other components, a sleeve 66, a hub 68, and one or more cones or rings 70, 72, and 74. The sleeve 66 has an external groove 76 for receiving a shift fork 78 which can be carried by a shift rail 80 that both can direct the sleeve's movement. The shift fork and rail can be controlled by a controller (not shown) to actuate and deactuate the synchronizer. The hub 68 can be splined to a transmission component, or in this case, attached to the transmission housing 18. And the cones or rings 70, 72, and 74 can provide various contact and friction surfaces during synchronization. The above construction and functionality are similar for a second synchronizer 82 and a third synchronizer 84.

The second synchronizer 82 is disposed adjacent the third planetary gear set 46, specifically adjacent the carrier 52 so that the second synchronizer can couple the carrier to the intermediate shaft 22 when actuated, and decouple the carrier from the intermediate shaft when deactuated. The second synchronizer 82 is also a double cone synchronizer that can have a sleeve, a hub, and one or more cones or rings. A controller similarly controls a shift fork and a shift rail.

The third synchronizer 84 is disposed adjacent the second planetary gear set 36, specifically adjacent the ring gear 44 so that the third synchronizer can ground the ring gear to the transmission housing 18 when actuated, and unground the ring gear from the housing when deactuated. The third synchronizer 84 can further couple the ring gear 44 to the second sleeve shaft 62 when actuated, and decouple the ring gear from the second sleeve shaft when deactuated. The third synchronizer 84 is also a double cone synchronizer that can have a sleeve, a hub, and one or more cones or rings. A controller similarly controls a shift fork and a shift rail.

FIG. 1 is only a schematic of the configuration of the transmission 10, and as such does not show the physical packaging of the transmission. But in general, the transmission can be packaged so that the input shaft 20, the intermediate shaft 22, and the output shaft 24 are generally aligned along an axis constituting the center axis of the transmission. Also, the first, second, and third planetary gear sets 26, 36, and 46 can be all coaxially arranged about the intermediate shaft 22; as can the first and second electric motors 56 and 60. Further, the first and second electric motors can circumscribe, or partly surround the first, second, and third planetary gear sets. And the first and second sleeve shafts 58 and 62 can circumscribe the intermediate shaft 22.

Referring to FIGS. 3 and 4, the transmission 10 can be dynamically shifted through several operating modes including a low EVT mode with a $1^{st}$ mode and a $2^{nd}$ mode, a high EVT mode with a $3^{rd}$ mode and a $4^{th}$ mode, and a reverse mode. In general, the operating modes can be controlled by various devices, sources, signals and the like. For example, an ECU (not shown) can be used to monitor various operating conditions—including speed resolvers 88, 90 to monitor the respective electric motor speeds, and speed sensors 92, 94 to monitor the respective input and output shaft speeds—and respond by controlling certain transmission components, like the synchronizers, to put the transmission in a particular operating mode. In each mode, a synchronizer can be actuated or deactuated to provide different speed ratios, output torques, and output speeds.

As mentioned, the transmission 10 can be of the two-mode type. This means that the transmission first goes through a low range, and then a high range. In the low range, the transmission 10 can operate in the low EVT mode with the first synchronizer 64 continually actuated "on" (S1) when the transmission shifts in the $1^{st}$ and $2^{nd}$ modes. And in the high range, the transmission 10 can operate in the high EVT mode with the second synchronizer 82 continuously actuated on (S2) when the transmission shifts in the $3^{rd}$ and $4^{th}$ modes.

For example, the transmission 10 can start in the low EVT mode to move the vehicle. Here, the transmission can have two operating options, both where the first synchronizer 64 can be actuated on (S1) to ground the ring gear 54. In option one, the second electric motor 60 (EM2) can alone drive the third planetary gear set 46 independent of the first electric motor 56 (EM1) and the mechanical engine 12 (ME). Or in option two, the second electric motor 60 can drive the third planetary gear set 46 in one direction to move the vehicle, while the first electric motor 56 can run in an opposite direction and then the mechanical engine 12 can also run. In either option, the electric motors can substantially synchronize the speed of the ring gear 44 with that of the second sleeve shaft 62 so that the third synchronizer 84 can be actuated on (S4) to couple the ring gear 44 to the second sleeve shaft 62. The transmission 10 is then shifted in the $1^{st}$ mode.

Still in the low EVT mode, the electric motors can substantially synchronize the speed of the carrier 52 with that of the intermediate shaft 22 so that the second synchronizer 82 can be actuated on (S2) to couple the carrier 52 to the intermediate shaft 22. Also, the third synchronizer 84 (S4) can be deactuated to decouple the ring gear 44 from the second sleeve shaft 62. The transmission 10 is then shifted in the $2^{nd}$ mode.

In the high range, the transmission 10 can operate in the high EVT mode. The electric motors can substantially synchronize the speed of the ring gear 44 with that of the second sleeve shaft 62 so that the third synchronizer 84 can be actuated on (S4) to couple the ring gear 44 to the second sleeve shaft 62. Also, the first synchronizer 64 can be deactuated to unground the ring gear 54, and, as mentioned, the second synchronizer 82 can be actuated on (S2). The transmission 10 is then shifted in the $3^{rd}$ mode.

Still in the high EVT mode, the third synchronizer 84 (S4) can be deactuated to decouple the ring gear 44 from the second sleeve shaft 62. Also, the electric motors can slow the speed of the ring gear 44 so that the third synchronizer 84 can be actuated on (S3) to ground the ring gear 44, and the second synchronizer 82 can be actuated on (S2). The transmission 10 is then shifted in the $4^{th}$ mode.

To shift in the reverse mode, the first synchronizer 64 can be actuated on (S1) to ground the ring gear 54, and the second electric motor 60 can rotate in a direction opposite of the direction it rotates when the vehicle moves forward. Further operating modes can include an engine start-stop mode and an electric mode, both where the first synchronizer 64 can be actuated on (S1).

Indeed, the graph of FIG. 3 shows that while the transmission is dynamically shifting through the $1^{st}$, $2^{nd}$, $3^{rd}$, and $4^{th}$ operating modes, the mechanical engine speed (ME) can remain generally constant and the vehicle output speed gradually increases.

While certain preferred embodiments have been shown and described, persons of ordinary skill in this art will readily recognize that the preceding description has been set forth in terms of description rather than limitation, and that various modifications and substitutions can be made without departing from the spirit and scope of the invention. The invention is defined by the following claims.

What is claimed is:

1. A transmission used in a hybrid vehicle comprising:
   an input shaft operatively connected to a mechanical engine and receiving torque therefrom;
   a planetary gear set operatively connected to the input shaft;
   an output shaft operatively connected to the planetary gear set;
   a plurality of electric motors selectively operated to synchronize a speed of the planetary gear set relative to a speed of another component of the transmission; and
   a synchronizer that is actuated when the speed of the planetary gear set is substantially synchronized relative to the speed of the another component of the transmission coupling the planetary gear set to the another component of the transmission during transmission of engine and electric motor torque through the input shaft, planetary gear set and output shaft, wherein synchronization to change a gear ratio is performed by utilizing torque from the plurality of electric motors without any substantial disturbance to transmission output torque, speed and power.

2. The hybrid vehicle transmission of claim 1, wherein the input shaft is a single input shaft.

3. The hybrid vehicle transmission of claim 2, wherein the single input shaft, planetary gear set, and output shaft are substantially coaxial.

4. The hybrid vehicle transmission of claim 1, wherein the another transmission component comprises a ground of the transmission.

5. The hybrid vehicle transmission of claim 4, wherein the transmission ground comprises a transmission housing.

6. The hybrid vehicle transmission of claim 1, wherein the plurality of electric motors substantially simultaneously contribute to propulsion of the vehicle and the synchronization of the planetary gear set with the another component of the transmission when synchronization is performed.

7. The hybrid vehicle transmission of claim 6, wherein the electric motors are axially spaced apart, wherein one of the electric motors is rotated in one direction and another one of the electric motors is rotated in an opposite direction during substantially synchronizing the speed of the planetary gear set relative to the speed of another component of the transmission.

8. The hybrid vehicle transmission of claim 1, wherein the another transmission component comprises a rotary intermediate shaft operatively connected to one of a ring gear, sun gear and carrier of the planetary gear set.

9. The hybrid vehicle transmission of claim 1, wherein electric motor operation is controlled to bring the relative rotational speed of the at least one transmission component within ±50 revolutions per minute of the at least one other transmission component.

10. A method of operating a transmission used in a hybrid vehicle comprising:
    providing a hybrid vehicle transmission comprised of a single input shaft connected to a mechanical engine, a plurality of electric motors, a first transmission component, a second transmission component comprised of a planetary gear set operatively connected to the plurality of electric motors, a synchronizer coupling the planetary gear set to the first transmission component when actuated, a controller in communication with the plurality of electric motors, an output shaft, and wherein the input shaft, plurality of electric motors, planetary gear set, and output shaft are substantially coaxial;

synchronizing a rotational speed of the first transmission component with a rotational speed of the planetary gear set by controlling the speed of the plurality of electric motors during transmission of torque through the input shaft, electric motors, planetary gear set and output shaft; and actuating the synchronizer coupling the first transmission component to the planetary gear set when the rotational speed of the first transmission component is substantially synchronized with the rotational speed of the planetary gear set in changing a gear ratio in the transmission.

11. The method of claim 10, wherein the synchronizing and actuating steps are performed utilizing torque from the plurality of electric motors without any substantial disturbance to transmission output torque, speed and power.

12. The method of claim 10, wherein the first transmission component comprises a rotary intermediate shaft that is substantially coaxial with the plurality of electric motors, planetary gear set and output shaft, the second transmission component comprises a carrier of the planetary gear set, during the synchronizing step the rotational speed of the intermediate shaft is synchronized so it is substantially the same as the rotational speed of the carrier of the planetary gear set, and during the actuating step, the synchronizer couples the intermediate shaft to the carrier of the planetary gear set.

13. The method of claim 10, wherein the first transmission component comprises a transmission ground and the second transmission component comprises one of a ring gear, sun gear and a carrier of the planetary gear set, during the synchronizing step the rotational speed of the one of a ring gear, sun gear and a carrier of the planetary gear set is synchronized so it is substantially the same as the transmission ground, and during the actuating step, the synchronizer couples the one of a ring gear, sun gear and a carrier of the planetary gear set to the transmission ground.

14. The method of claim 10, wherein the electric motors are spaced apart from one another and during the synchronizing step one of the plurality of electric motors is rotated in one direction and another one of the plurality of electric motors is rotated in an opposite direction.

15. The method of claim 10, wherein during the synchronizing step the controller controls the speed of the plurality of electric motors to bring the relative rotational speed of the first transmission component within ±50 revolutions per minute of the planetary gear set.

* * * * *